Figure 1:
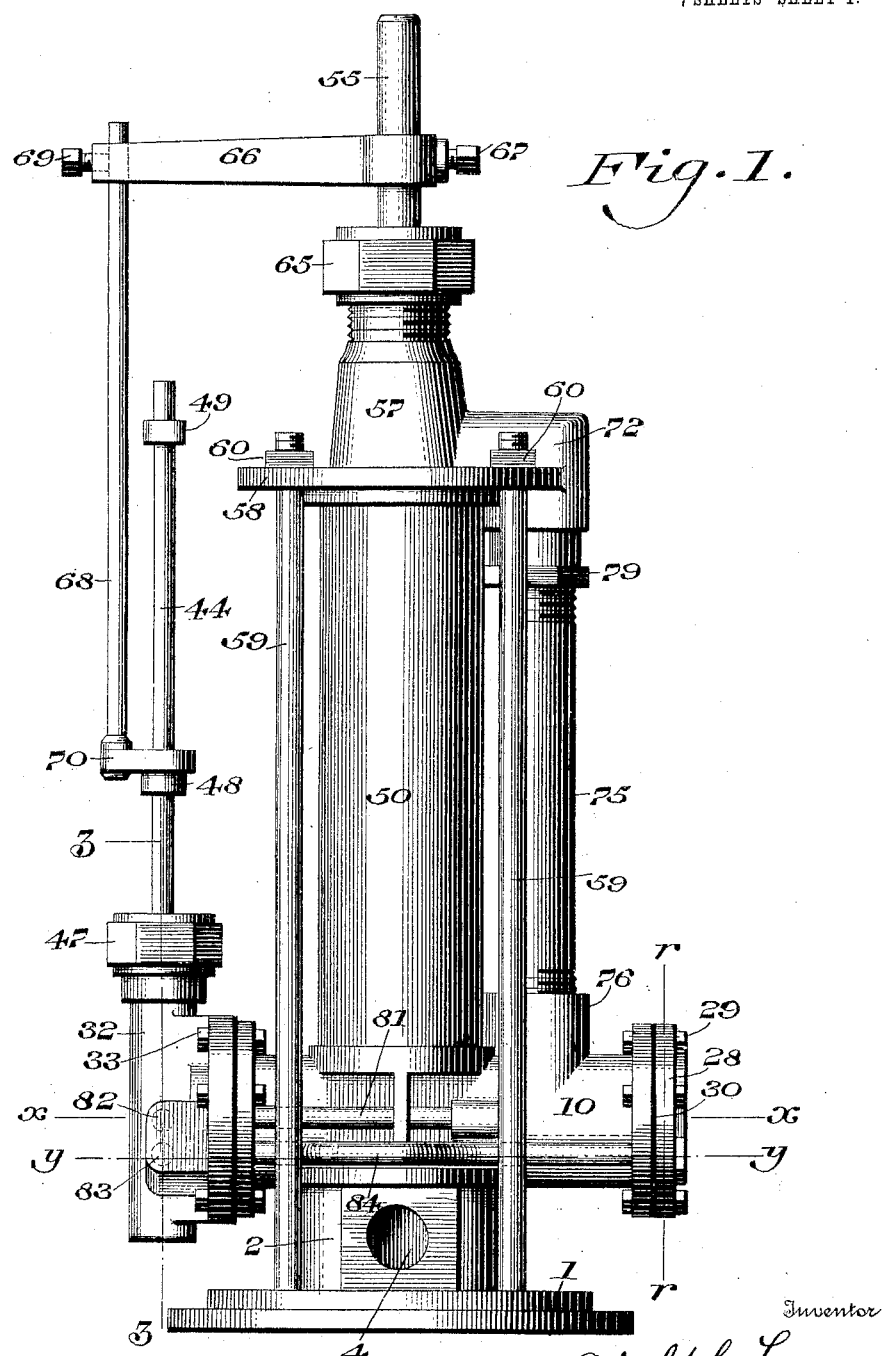

No. 856,709. PATENTED JUNE 11, 1907.
A. LANG.
WATER MOTOR.
APPLICATION FILED APR. 24, 1906.

7 SHEETS—SHEET 3.

Witnesses
P. F. Nagle.
L. Donville.

Inventor
Adolph Lang,
By Wiedersheim & Fairbanks
Attorneys

No. 856,709.  
PATENTED JUNE 11, 1907.
A. LANG.  
WATER MOTOR.  
APPLICATION FILED APR. 24, 1906.
7 SHEETS—SHEET 4.
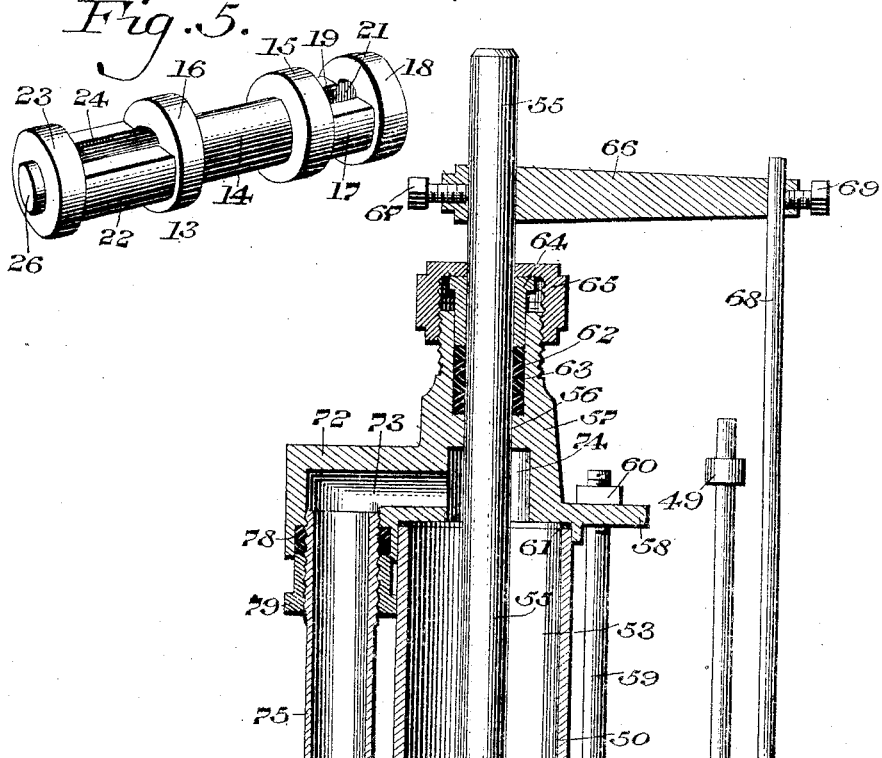
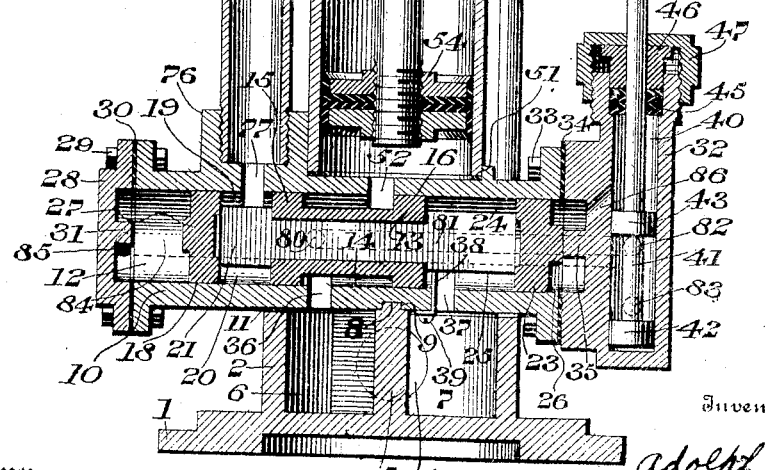
Witnesses  
P. F. Nagle.  
L. Douville.
Inventor  
Adolph Lang.  
By Wiedersheim & Fairbanks  
Attorneys No. 856,709.　　　　　　　　　　　　　　PATENTED JUNE 11, 1907.
A. LANG.
WATER MOTOR.
APPLICATION FILED APR. 24, 1906.
7 SHEETS—SHEET 5.
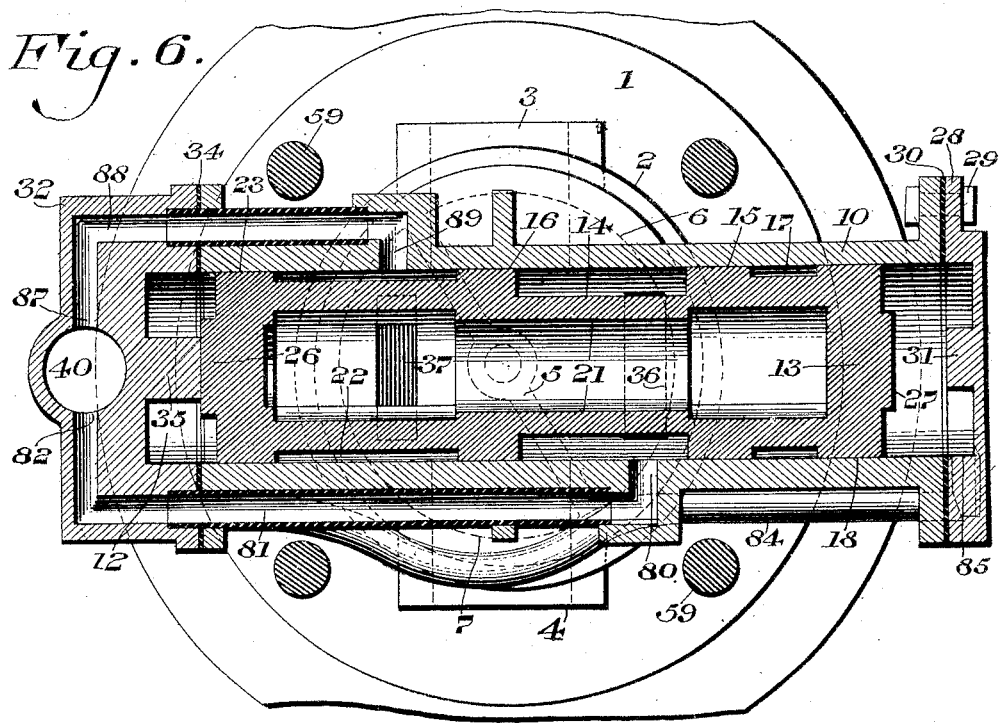
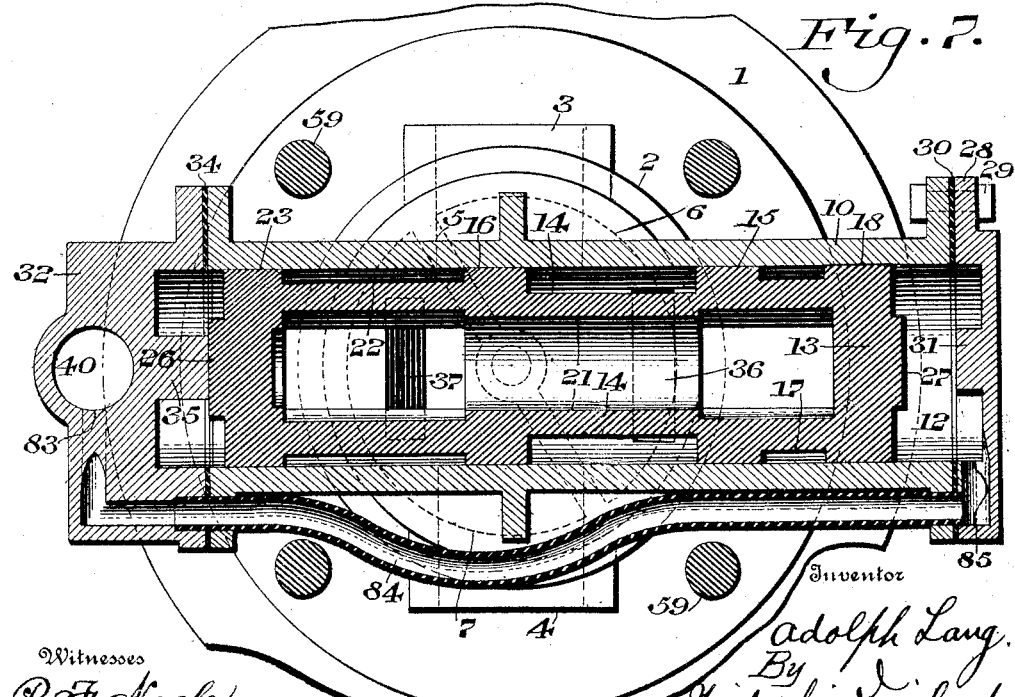
Witnesses
P. F. Nagle.
L. Douville.
Inventor
Adolph Lang.
By Wiedersheim & Fairbanks.
Attorneys

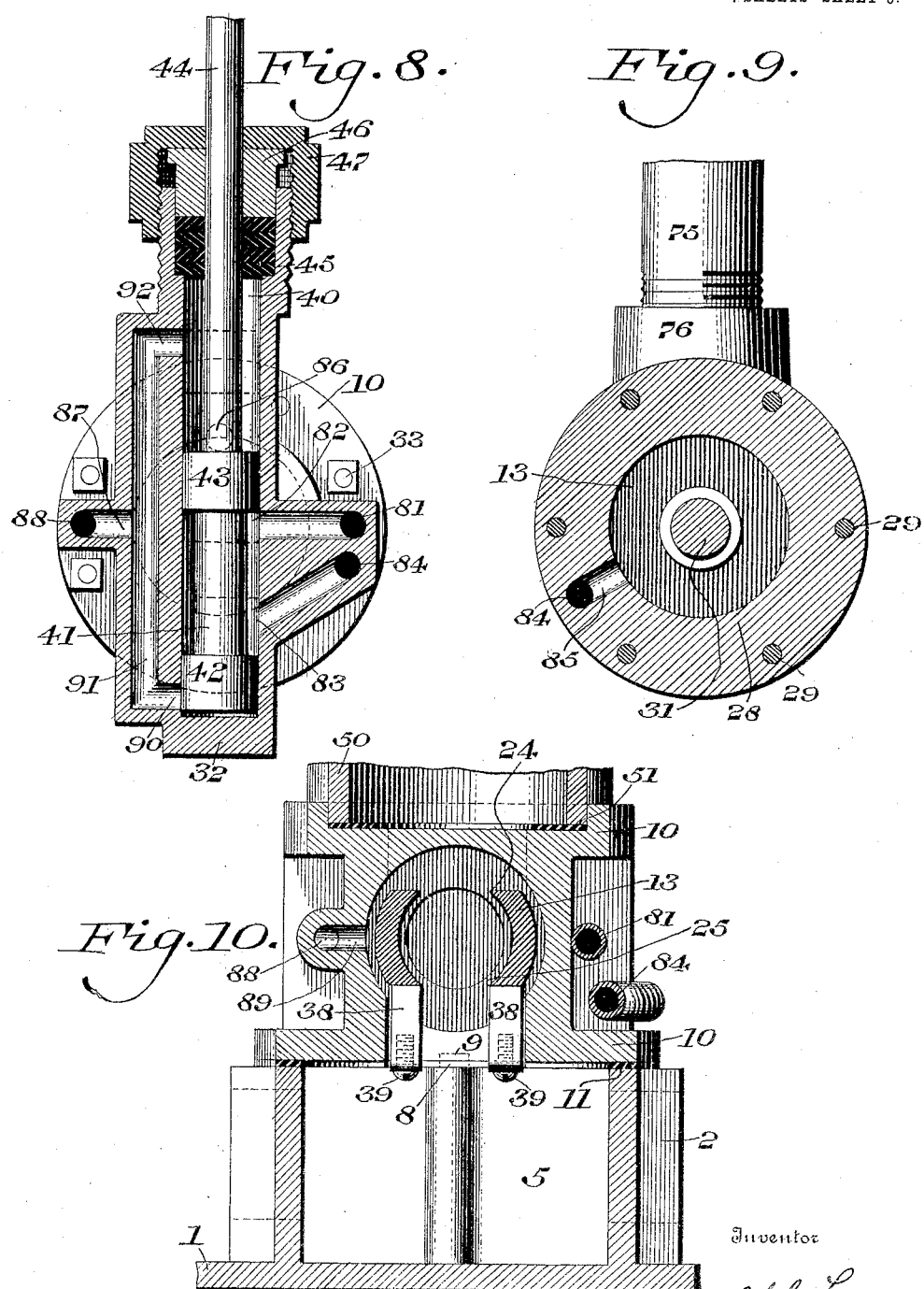

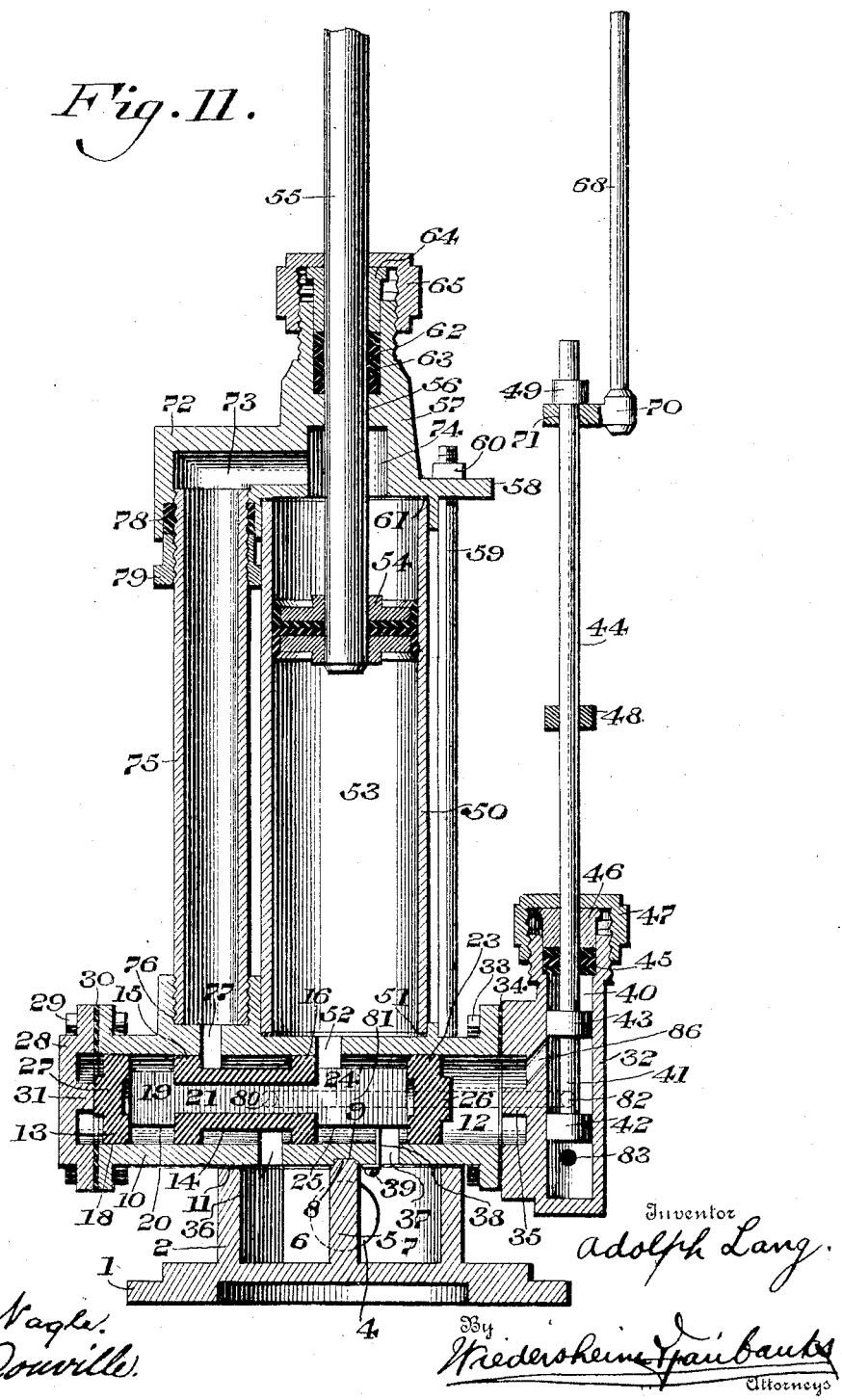

UNITED STATES PATENT OFFICE.

ADOLPH LANG, OF PHILADELPHIA, PENNSYLVANIA, ASSIGNOR OF ONE-THIRD TO HARPER F. SMITH AND ONE-THIRD TO CHARLES H. ZINK, OF PHILADELPHIA, PENNSYLVANIA.

WATER-MOTOR.

No. 856,709.      Specification of Letters Patent.      Patented June 11, 1907.

Application filed April 24, 1906. Serial No. 313,433.

*To all whom it may concern:*

Be it known that I, ADOLPH LANG, a citizen of the United States, residing in the city and county of Philadelphia, State of Pennsylvania, have invented a new and useful Water-Motor, of which the following is a specification.

The object of my present invention is to construct a water motor in such a manner that the water will have a substantially free passage therethrough and which although of simple and compact construction may be operated under a low head and give reliable and efficient results under all conditions which may arise.

To the above ends my invention consists of a novel construction of a water motor in which the movements of the actuating piston are controlled by a novel construction of a slide valve, the movement of said slide valve being controlled by a throw valve, which is adapted to be actuated by the piston rod of said piston.

It further consists of a base subdivided into two chambers, one of which constitutes the feed chamber and the other the exhaust chamber, said chambers being so constructed as to permit the retention of any foreign matter in the water in order that the operation of the motor may never be impeded or interfered with, in combination with a novel construction of a slide valve having a feed area therearound and a chamber therein, the exhaust water passing through said chamber and through exhaust ports in said valve and in the casing in which it is mounted.

It further consists of novel means for preventing the rotation of the slide valve employed.

It further consists of a novel construction in which the slide valve is mounted directly above the inlet and exhaust chambers, the piston casing being mounted above the slide valve, the slide valve and the ends of the slide valve casing being provided with lugs, thereby forming chambers in which any sediment or foreign material will be collected, so that the same may be readily removed when desired without dismantling the entire motor.

It further consists of a novel construction and arrangement of ports and passages whereby the different valves and pistons and their adjuncts co-operate to accomplish the desired result.

It further consists of novel features of construction, all as will be hereinafter fully set forth.

For the purpose of illustrating my invention, I have shown one form of machine as this embodiment best illustrates the principle of my invention, although it is obvious that the principal instrumentalities of which my invention consists can be variously arranged and organized and in the accompanying drawings, I have shown one embodiment thereof which I have found in practice to give satisfactory results, although it is to be understood that my invention is not limited to this specific arrangement and organization of these instrumentalities.

Figure 2:
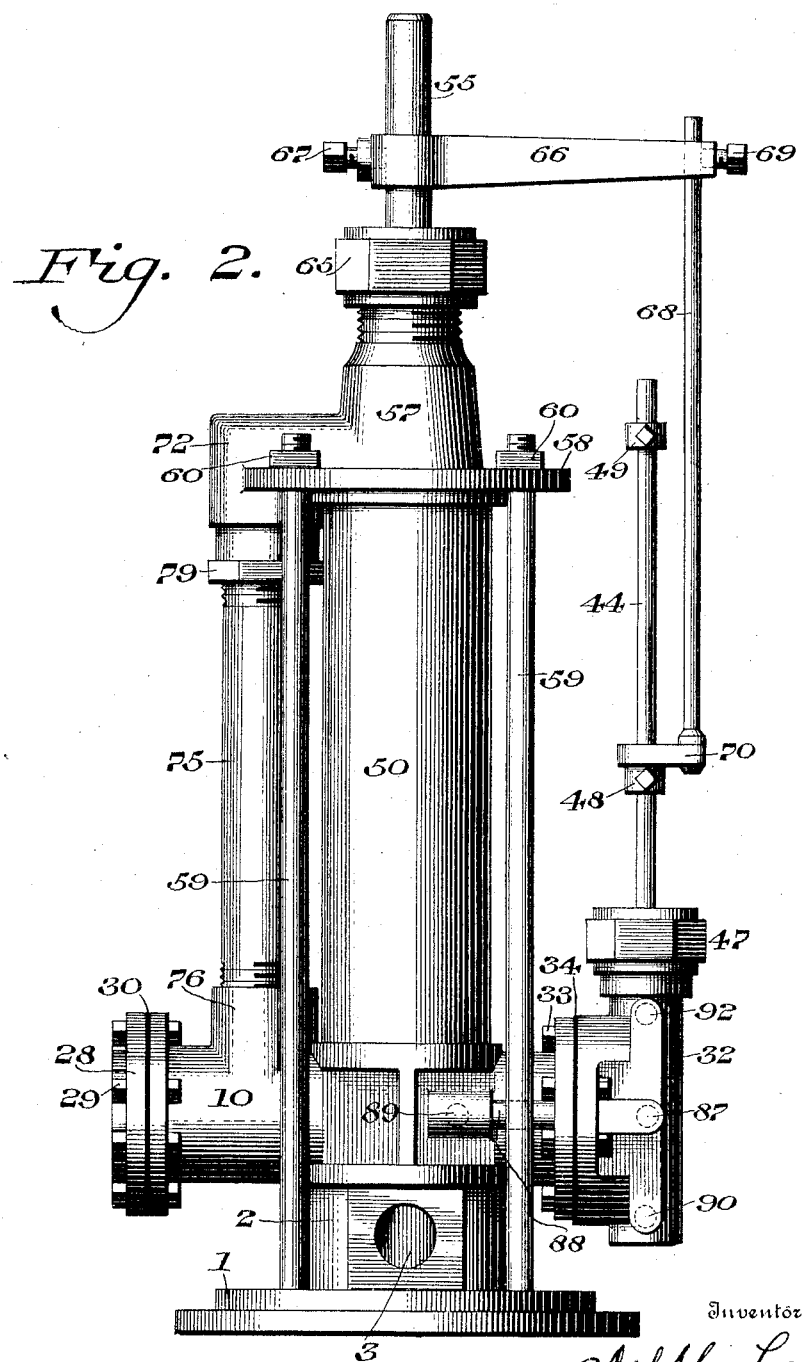
Figure 3:
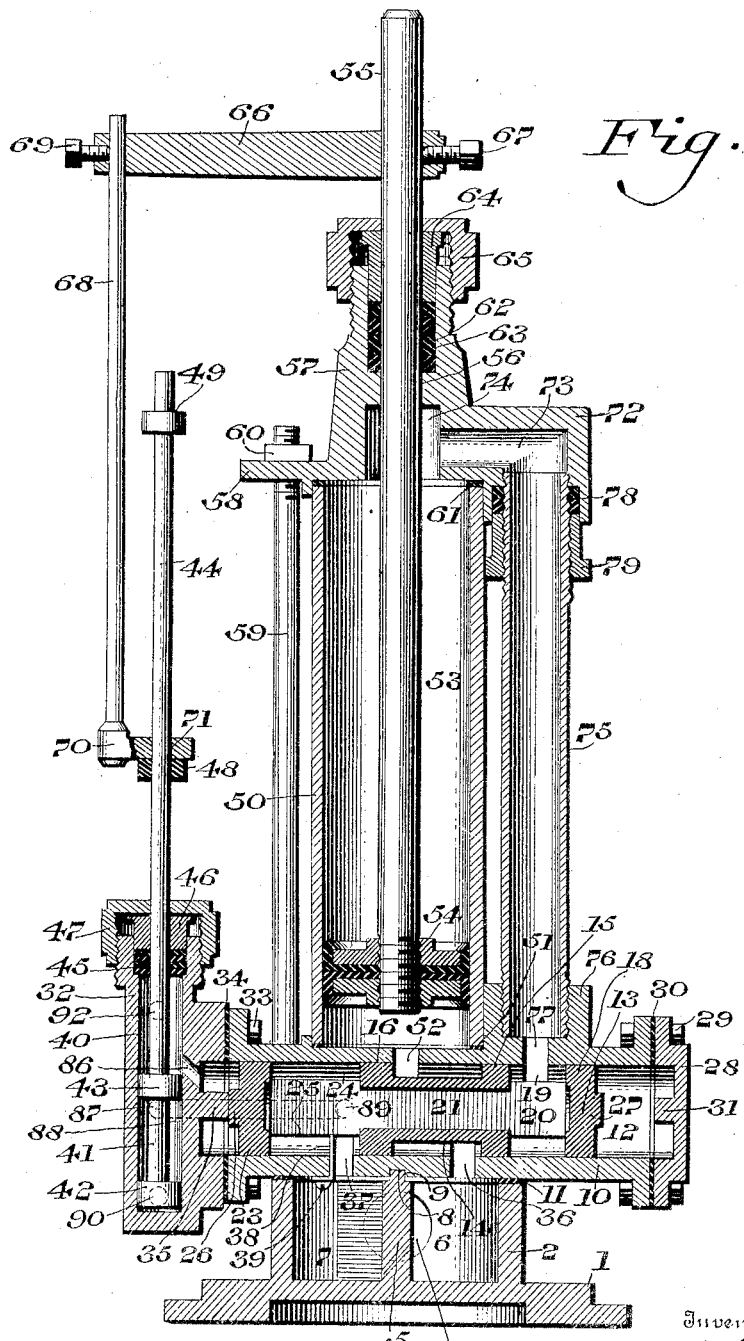

Figure 1 represents a side elevation of a water motor embodying my invention. Fig. 2 represents a side elevation of the water motor, the same being viewed from the opposite direction to that seen in Fig. 1. Fig. 3 represents a sectional elevation of Fig. 1. Fig. 4 represents a sectional elevation of Fig. 2. Fig. 5 represents a perspective view of the slide valve in detached position. Fig. 6 represents a sectional plan view on an enlarged scale on line $x$—$x$, Fig. 1. Fig. 7 represents a sectional plan view on an enlarged scale on line $y$—$y$, Fig. 1. Fig. 8 represents a section on an enlarged scale on line $z$—$z$, Fig. 1. Fig 9 represents a section on an enlarged scale on line $r$—$r$, Fig. 1. Fig. 10 represents a fragmentary section of my device on an enlarged scale. Fig. 11 represents a sectional elevation showing the parts in a different relation to each other.

Similar numerals of reference indicate corresponding parts in the figures.

Referring to the drawings: 1 designates a base from which rises a casing 2 provided with an inlet 3 and an outlet 4, which are adapted to be connected in any suitable manner with the conduits leading to the source of supply and to the exhaust pipe.

5 designates a diaphragm or partition which divides the interior of the casing 2 into an inlet chamber 6 and an outlet or exhaust chamber 7, said diaphragm 5 having at its upper end a reduced end or tongue 8, which is adapted to engage or be seated in a recess 9 in the bottom of a slide valve casing 10, which is adapted to be seated on the casing 2, there being suitable material such as a packing washer 11 interposed between the casing 10 and the top of the casing 2 and the upper face of the diaphragm 5, as most clearly indicated in Figs. 3 and 4, in order that a water tight joint may be formed between the inlet and outlet chambers 6 and 7 and the casings 2 and 10. The casing 10 is provided with a chamber or bore 12 in which is adapted to reciprocate a slide valve 13, which is provided intermediate its ends with an annular groove or reduced neck 14, on either side of which are the bearings 15 and 16.

17 designates a neck or reduced portion contiguous the bearing 15 beyond which is a bearing 18, the opposite side of the portion 17 being faced off to form ports 19 and 20 which communicate with the inner chamber 21 of the valve 13.

22 designates a neck or reduced portion contiguous the bearing 16 beyond which is a bearing 23, it being noted that in the present instance, the bearings 23, 16, 15 and 18 have substantially the same diameter and have a sliding fit within the bore 12 of the slide valve casing 10.

24 and 25 designate ports in the reduced portion 22 of the valve 13 and communicating with the chamber 21 therein.

26 and 27 designate bosses or lugs carried by the opposite ends of the valve 13.

28 designates an end piece or cover, which is removably secured to the flanged end of the casing 10 by any suitable fastening devices such as bolts and nuts 29, there being suitable packing material 30 interposed between the end piece 28 and the casing 10 in order to form a fluid tight joint therebetween.

31 designates a lug or projection extending inwardly from the end piece 28 and against which the lug or boss 27 carried by the valve 13 is adapted to abut or be seated during the operation.

32 designates a throw valve casing, which serves as a cover or end piece for the other end of the casing 10, said casing being secured to the flanged end of the casing 10 by any suitable fastening devices such as the bolts 33, there being interposed between the end of the casing 10 and the casing 32 suitable packing material 34, in order that a fluid tight joint may be made between said casings. The casing 32 is provided with an inwardly extending lug or boss 35 similar to the lug 31 carried by the other end piece 28, said lug 35 serving as an abutment or seat for the lug 26 carried by the slide valve 13.

36 designates a port through the casing 10 communicating with the chamber 12 therein and with the inlet chamber 6 in the casing 2.

37 designates a port through the casing 10 communicating with the chamber 12 therein and also with the outlet or exhaust chamber 7 in the casing 2. The slide valve 13 is non-rotatably mounted in any suitable manner within the casing 10 and in the present instance I have shown this as being accomplished by means of angle plates or members 38, which are secured to the casing 10 by means of any suitable fastening device such as screws 39, the ends of said plates or members engaging in the present instance the faced off portions of the neck 22 and thus preventing the rotation of the slide valve 13.

40 designates a chamber within the casing 32, which latter in the present instance is angularly inclined with respect to the casing 10.

41 designates a throw valve having the enlarged heads or bearings 42 and 43, there being a valve rod or stem 44 extending from the bearing 43 and passing through the packing 45, which latter is retained in place by means of a gland nut 46 and a cap 47, which has threaded or other engagement with the upper end of the casing 32.

48 and 49 designates set collars adjustably mounted on the valve rod or stem 44, although the same may be integral therewith if desired.

50 designates a piston casing, which is mounted on the casing 10, there being suitable packing material 51 interposed between the end of the casing 50 and the casing 10 in order to form a fluid tight joint therebetween.

52 designates a port in the casing 10, which communicates with the chamber 12 therein and also with a chamber 53 in the piston casing 50.

54 designates a piston head of any suitable or conventional type having secured thereto in any suitable manner and extending therefrom, a piston rod 55, which passes through an aperture 56 in a top or cover 57. The cover 57 is provided with a flange 58 through which pass rods 59, which pass through the base 1 or are secured thereto in any suitable manner, the upper ends of said rods being provided with nuts or equivalent devices 60, there being suitable packing material 61 interposed between the upper end of the casing 50 and the cover 57 in order to form a water tight joint.

62 designates packing material in a chamber 63 in the upper end of the casing 57, said packing being retained in place by means of a gland nut 64 and a cap 65, which has engagement with the cover 57, it being understood that the piston rod 55 passes through the packing 62, the gland nut 64 and the cap 65.

66 designates a rod or bar adjustably mounted on the piston rod 55 by means of a bolt or set screw 67, said rod or bar 66 having passing therethrough a rod 68, which is adjustable therein by means of a set screw or equivalent device 69.

70 designates a block, bracket or plate carried by the rod 68, said block having an aperture 71 therethrough, thereby adapting the same to travel upon the throw valve rod 44.

72 designates an enlargement of the casing cover 57 having a passage 73 therethrough, which communicates with a chamber 74 opening into the upper end of the piston chamber 53.

75 designates a tube or conduit having threaded or other engagement with the enlargement 72, the inner bore of one end of said conduit communicating with the passage 73, the other end of said conduit 75 having threaded or other engagement with a boss 76 carried by the casing 10, there being a port 77 in the casing 10 communicating with the inner bore of said conduit 75 and with the chamber 12 of the casing 10.

78 designates packing material which is maintained in place by a nut 79 having engagement with the conduit 75 thereby forming a water tight joint between the parts.

80 designates a feed port communicating with the chamber 12 in the casing 10 and with a passage 81, which communicates with a port 82 which opens into the throw valve chamber 40.

83 designates a port opening into the throw valve chamber 40, which communicates by means of a passage 84 with a port 85, which opens into the opposite end of the chamber 12.

86 designates a port in the throw valve casing 32 communicating with the throw valve chamber 40 and with the chamber 12 as clearly indicated in Figs. 3 and 4.

87 designates an exhaust port in the throw valve chamber 40, which communicates by means of a passage 88 with a port 89, which opens into the chamber 12 in proximity to the exhaust port 37 leading therefrom.

90 designates a port communicating with the throw valve chamber 40 and with a passage 91, which communicates with the passage 88 and also with a port 92 which latter opens into the chamber 40 near the upper end thereof.

The operation of the motor will now be readily apparent and is as follows:—Having the parts in the position seen in Figs. 3 and 4, the water from a suitable source of supply enters through the inlet 3, and passes into the inlet chamber 6 in the casing 2 thence through the port 36 into the chamber 12, around the annular groove or neck 14 of the slide valve 13, through the port 52 into the piston chamber 53 and acting on the piston head 54 causes said head and the piston rod 55 carried thereby to move upwardly into the position indicated in Fig. 11. The water above the piston head 54 will exhaust through the chamber 74, passage 73, conduit 75, port 77, thence through the port 19 which at this time registers therewith, into the chamber 21 of the valve 13, thence through the port 25 and port 37, which it is understood is now open to the exhaust fluid, the water exhausting through said port 37 into the chamber 7 and then through the outlet 4 as will be apparent. As the piston rod 55 moves upwardly, the rod or bar 66 carried thereby and to which the rod or shaft 68 is secured will cause this rod 68 to move in unison therewith. As the piston head 54 approaches the upper end of the piston chamber 53, the block or bracket 70 carried by the rod 68 will engage the set collar or boss 49 on the valve stem 44 and cause said valve stem and its adjuncts to be raised, the parts now appearing as seen in Fig. 11. Having the parts in the position seen in Fig. 3 and 4, the slide valve 13 is maintained in position owing to water passing from the inlet port 36 around the annular groove 14, thence through port 80, passage 81 and port 82 into the throw valve chamber 40 and thence through port 83, passage 84 and port 85 into the chamber 12, the pressure of the water being exerted against the end of the slide valve opposite the throw valve casing 32. As the throw valve 41 moves upwardly, the head 43 will uncover the port 86 and the head 42 will pass above the port 83 so that water entering through the inlet port 36 from the inlet chamber 6 may now pass around the annular groove 14, through ports 80, passage 81 and port 82 into the throw valve chamber 40, and since the throw valve is now in the position as indicated in dotted lines in Fig. 8 and full lines in Fig. 11, this water will pass through the port 86 and acting against this end of the slide valve will cause the same to move to the opposite end of the slide valve chamber 12, so that the lug 27 abuts or is seated against the lug 31, the water in rear of the slide valve exhausting through port 85, passage 84 and port 83 into the throw valve chamber 40, thence through port 90, passage 91, port 87, passage 88, port 89 around the annular groove 22 and through the exhaust port 37 into the chamber 7 and thence to the outlet 4, the parts now being in the position seen in Fig. 11. The water entering the inlet 3 passes into the inlet chamber 6, thence through port 36 around the annular groove 14 of the slide valve 13 and since the head or bearing 16 has now moved beyond the port 52 so that the port 77 communicates with the chamber formed between the groove 14 and the walls of the casing, the water will pass through port 77, conduit 75, passage 73, chamber 74 into the piston chamber 53 and acting against the piston head 54 will cause the same to move downwardly to the position seen in Figs. 3 and 4. The water below the piston head 54 will exhaust through port 52, port 24, chamber 21, port 25, exhaust port 37, exhaust chamber 7 and thence to the outlet 4. As the piston head 54 moves downwardly, the piston rod 55 will cause the bar 66 to move downwardly and thereby the rod 68. The plate or block 70 slides freely on the valve stem 44, which remains in its raised position until said block 70 contacts with the set collar or boss 48 on the stem 44, whereupon said stem and the throw valve 41 will be moved downwardly from the position seen in Fig. 11 to the position seen in Figs. 3 and 4. The head 42 will close the port 90 and open the port 83, the head 43 will pass below the port 86, so that the water may exhaust through port 86 in the throw valve chamber 40, thence through port 92, the passage 91, port 87 to the exhaust passage 88 and thence through port 89 around the annular groove 22, through the exhaust port 37 into the exhaust chamber 7 and thence to the outlet 4. The water which changes the slide valve will pass from the inlet chamber 6 through the port 36, around the annular groove 14 of the slide valve 13, thence through port 80, the passage 81 and ports 82 into the throw valve chamber 40, thence through ports 83, passage 84 and port 85 to the rear of the valve and cause said slide valve to assume the position seen in Figs. 3, 4, 6 and 7.

Although in the present instance I have shown a hollow slide valve having portions thereof faced off in order that the angle plates engaging therewith will prevent rotation of said valve, it will be apparent that this slide valve may be otherwise mounted therein, it being only essential that there be ports therein through which the exhausting fluid may pass and it is evident that the means employed for preventing the rotation of this valve may be varied according to the conditions and requirements.

It will be apparent that the length of the stroke of the piston rod 55 may be varied as desired by adjusting the set collars 48 and 49 on the valve rod 44, thereby varying accordingly the time at which the throw valve is actuated which controls the admission and exhaust of fluid to actuate the slide valve, which latter controls the admission and exhaust of fluid to the piston chamber to actuate the piston therein, and owing to the positive manner in which this throw valve is actuated, the admission and exhaust of fluid to the motor will be controlled in a very accurate manner.

The different parts of the motor may readily be assembled and disassembled when desired. It will be also apparent that in some cases, I may dispense with the lugs either on the ends of the piston or the ends of the slide valve casing, since the same are not essential under all conditions.

Owing to the construction and arrangement of the ports in the throw valve casing and the passages leading therefrom and the chamber formed between the heads 43 and 42 in the casing 32, the throw valve chamber is always open to the entrance of feed water to control the movement of the slide valve. It will be further apparent that either the slide valve or throw valve may be readily inspected at any time without dismantling the entire device.

Owing to the construction of the inlet chamber 6, the greater part of the foreign material contained in the water will be deposited therein and owing to the provision of the lugs on the end of the slide valve piston and the lugs carried by the end of the slide valve casing, chambers will be formed at each end of the slide valve casing in which sediment or other foreign material may collect without interfering with the operation of the slide valve. In the present instance, I have shown as my preferred form, a construction in which the slide valve casing is located intermediate the inlet and the exhaust chambers and the piston casing, although it will be apparent that I may assemble and correlate the parts in a different manner and still be within the scope of my invention. The stroke of the throw valve may be adjusted in a variety of ways, either by adjusting the rod 66 on the piston rod 55 by means of the set screw 67, or by adjusting the rod or bar 68 in the arm or rod 66, or by adjusting the set collars 48 and 49 on the throw valve rod 44. It will thus be apparent that my invention in its broad scope comprises a reciprocating piston, which is controlled by means of a novel construction of a slide valve around which the inlet water passes and through which the exhaust water passes to actuate said piston and a novel construction of a throw valve for controlling the passage of water to actuate the slide valve, said throw valve being operatively connected with the piston rod, and means being provided for preventing the rotation of said slide valve.

It will be apparent from the foregoing that I have produced a novel and useful construction of water motor which embodies the features of advantage enumerated in the statement of invention and the above description and while I have, in the present instance shown the preferred embodiment thereof, it will be apparent that it is susceptible of modification in various particulars without departing from the spirit and scope of the invention, or sacrificing any of its advantages. In the present instance, I have shown the passages through which water passes to actuate the slide valve as being composed of separate pipes having engagement with different parts of the casing, but it will be apparent that these passages may be formed in the slide valve casing and still be within the scope of my invention.

Having thus described my invention, what I claim as new, and desire to secure by Letters Patent, is:—

1. In a water motor, a casing, having an inlet and an outlet chamber, a slide valve casing mounted thereon having an inlet port communicating with the inlet chamber and an exhaust port communicating with the outlet chamber, a piston casing mounted on said slide valve casing, the latter having ports therein communicating with opposite ends of said piston casing, a piston in said casing, a hollow slide valve provided with an annular groove always open to said inlet port and having an exhaust port therein always communicating with said slide valve casing exhaust port, there being ports in said slide valve alternately communicating with the ports leading to opposite ends of the piston casing, and means actuated by the movement of said piston for controlling said slide valve.

2. In a water motor, a casing having an inlet and an outlet chamber, a slide valve casing located thereon, a piston casing located on said slide valve casing, a piston in said piston casing, there being ports and passage leading from said slide valve casing into said piston casing and ports leading from said slide valve casing into said inlet and outlet chambers, a slide valve within the slide valve casing, means for preventing the rotation of said slide valve, and means for changing the position of said slide valve relative to the movement of said piston.

3. In a water motor, a casing, having an inlet and an outlet chamber, a slide valve casing mounted thereon having an inlet port communicating with the inlet chamber and an exhaust port communicating with the outlet chamber, a piston casing mounted on said slide valve casing, the latter having ports therein communicating with opposite ends of said piston casing, a piston in said casing, a hollow slide valve provided with an annular groove always open to said inlet port and having a port therein always communicating with said exhaust port, there being ports alternately communicating with ports opening into opposite ends of the piston casing, said slide valve being non-rotatably mounted in the slide valve casing, and means actuated by the movement of said piston for controlling said slide valve.

4. In a water motor, a casing having a diaphragm forming an inlet and an outlet chamber therein, said diaphragm having a tongue, a slide valve casing having a recess with which said tongue engages, there being an inlet port communicating with the inlet chamber and an exhaust port communicating with the outlet chamber, a piston casing mounted on said slide valve casing, there being ports in the latter communicating with opposite ends of said piston casing, a piston mounted in said piston casing, a hollow slide valve having a plurality of annular grooves thereon, one of said grooves being always open to said inlet port, there being a port in said valve always open to the exhaust port and ports controlling admission and exhaust of fluid from opposite ends of the piston, a throw valve casing carried by the slide valve casing, there being ports and passages communicating with the slide valve casing and the throw valve casing to admit fluid through opposite ends of said slide valve, a throw valve in the throw valve casing for controlling such admission, a valve stem therefor, set collars carried by said stem, and means actuated by said piston and co-acting with said set collars to actuate said throw valve.

5. In a water motor, a casing having a diaphragm therein forming an inlet and an outlet chamber, there being a tongue extending from said diaphragm, a slide valve casing mounted above said chambers and having a recess with which said tongue engages, there being an inlet port communicating with the inlet chamber and an exhaust port communicating with the outlet chamber, a piston casing mounted on said slide valve casing, there being ports communicating with opposite ends of said piston chamber, a piston in said chamber, a piston rod carried thereby, an arm adjustably mounted on said piston rod, a rod adjustably mounted in said arm, a bracket carried by said rod, a throw valve stem on which said bracket is movable, set collars on said stem with which said bracket co-acts to actuate said throw valve stem, a throw valve carried by said stem, and a slide valve in the slide valve casing controlling admission and exhaust of fluid to the piston casing, said slide valve being controlled by said throw valve.

6. In a water motor, a casing having a diaphragm forming an inlet and an outlet chamber therein, a slide valve casing mounted above said chambers and having an inlet port communicating with the inlet chamber and an outlet port communicating with the outlet chamber, a hollow slide valve non-rotatably mounted in the slide valve casing and having a plurality of annular grooves, one of said grooves being always open to the inlet port and having a port always open to the exhaust port, a piston casing mounted on the slide valve casing, there being ports communicating with opposite ends of the piston casing and with which the groove always open to the inlet port alternately registers, a piston in said piston chamber, there being exhaust ports in the slide valve alternately registering with ports communicating with opposite ends of the piston chamber, a piston rod carried by the piston, an arm adjustably mounted thereon, a tappet adjustably carried by said arm, a throw valve adapted to actuate said slide valve, a stem extending therefrom on which said tappet travels, and means adjustably mounted on said stem with which said tappet co-acts to actuate the throw valve.

7. In a water motor, a casing having a diaphragm dividing the same into an inlet and an outlet chamber, a slide valve casing mounted thereon and having an inlet port communicating with the inlet chamber and an exhaust port communicating with the outlet chamber, a hollow slide valve having a plurality of annular grooves mounted in said slide valve casing, one of said grooves being always open to the inlet port and one of said grooves being always open to the exhaust port, there being a port in the slide valve communicating with said latter groove, a piston casing mounted on said slide valve casing, the latter having ports communicating with the opposite ends thereof, said slide valve having ports therein alternately communicating with said latter ports, a throw valve casing adapted to close one end of the slide valve casing, and having a lug serving as a seat for said slide valve, a closure for the other end of said slide valve casing having a lug serving as a seat for the other end of the slide valve, and means actuated by the piston for admitting motive fluid to and exhausting motive fluid from opposite ends of the slide valve piston at a predetermined point in the travel of said piston.

8. In a water motor, a casing having a diaphragm dividing the same into an inlet and an outlet chamber, a slide valve casing mounted thereon having an inlet port communicating with the inlet chamber and an exhaust port communicating with the outlet chamber, a slide valve having imperforate ends mounted in said slide valve casing, a throw valve casing forming a closure for one end of said slide valve casing and having ports communicating with opposite ends of the slide valve casing, there being a feed port in the slide valve casing having a port always open to the inlet of fluid and communicating with the port opening into the throw valve casing, a reciprocating piston controlled by said slide valve, and a valve in the throw valve casing operatively connected with said piston, and controlling the ports in the throw valve casing and thereby the movement of said slide valve.

9. In a water motor, a casing having an inlet and an outlet chamber therein, a slide valve casing mounted thereon, means for preventing improper movement with respect thereto, said slide valve casing having an inlet port communicating with the inlet chamber and an exhaust port communicating with the outlet chamber, a hollow slide valve having a plurality of annular grooves thereon mounted in said slide valve casing, one of said grooves being always open to the inlet port, there being a port in said valve always communicating with the exhaust port, a piston casing mounted on said slide valve casing, the latter having ports therein communicating with opposite ends of the piston casing, there being ports in the slide valve adapted to coact with said latter ports, a piston within the piston casing, a piston rod carried thereby, an arm adjustably mounted on said piston rod, a rod adjustably carried by said arm, a bracket carried by said rod, a throw valve controlling admission of motive fluid to opposite ends of the slide valve casing to actuate said slide valve, a valve rod extending from said throw valve, and set collars adjustably carried by said rod with which said bracket co-acts to actuate said throw valve.

10. In a water motor, a casing having an inlet and an outlet chamber therein, a slide valve casing mounted thereon, means for preventing improper movement with respect thereto, said slide valve casing having an inlet port communicating with the inlet chamber and an exhaust port communicating with the outlet chamber, a hollow slide valve having a plurality of annular grooves thereon mounted in said slide valve casing, one of said grooves being always open to the inlet port, there being a port in said valve always communicating with the exhaust port, a piston casing mounted on said slide valve casing, the latter having ports therein communicating with opposite ends of the piston casing, there being ports in the slide valve adapted to coact with said latter ports, a piston within the piston casing, a piston rod carried thereby, an arm adjustably mounted on said piston rod, a rod adjustably carried by said arm, a bracket carried by said rod, a throw valve controlling admission of motive fluid to opposite ends of the slide valve casing to actuate said slide valve, a valve rod extending from said throw valve, and means for preventing the rotation of said slide valve.

11. In a water motor, a casing having a diaphragm forming an inlet and an outlet chamber, a slide valve mounted thereon and having an inlet port communicating with the inlet chamber and an exhaust port communicating with the outlet chamber, a closure for one end of said casing having an inwardly extending lug, a chambered throw valve casing adapted to close the other end of said casing and having an inwardly extending lug, a hollow slide valve mounted in the slide valve chamber and adapted to alternately engage said lugs, said valve having a plurality of annular grooves, one of said grooves being always open to the inlet port, one of said grooves being always open to the exhaust port, a piston casing, a piston therein, there being ports in the slide valve casing communicating with opposite ends of the piston casing and alternately serving as inlet and exhaust ports, means for conducting water from the inlet chamber into the chamber in the throw valve casing, means for conducting water from the throw valve casing to opposite ends of the slide valve casing, and a throw valve operatively connected with the piston and mounted in said chamber for controlling said means.

12. In a water motor, a casing having a diaphragm therein forming an inlet and an outlet chamber, a slide valve mounted thereon and having an inlet port communicating with the inlet chamber and an exhaust port communicating with the outlet chamber, a closure for one end of said casing having an inwardly extending lug, a chambered throw valve casing adapted to close the other end of said casing and having an inwardly extending lug, a hollow slide valve mounted in the slide valve chamber and adapted to alternately engage said lugs, said valve having a plurality of annular grooves, one of said grooves being always open to the inlet port, one of said grooves being always open to the exhaust port, a piston casing, a piston therein, there being ports in the slide valve casing communicating with opposite ends of the piston casing and alternately serving as inlet and exhaust ports, means for conducting water from the inlet chamber into the chamber in the throw valve casing, means for conducting water from the throw valve casing to opposite ends of the slide valve casing, said slide valve having the side contiguous the exhaust port faced off, and means carried by the slide valve casing engaging said faced off side for preventing the rotation of said slide valve.

13. In a water motor, a casing having a diaphragm forming inlet and outlet chambers, a slide valve casing mounted thereon having an inlet port communicating with the inlet chamber and an exhaust port communicating with the outlet chamber, means for preventing any relative lateral movement of said casings, a hollow slide valve within said casing and having a plurality of annular grooves thereon, one of said grooves always communicating with the inlet port, and one of said grooves always communicating with the exhaust port, a piston casing mounted on the slide valve casing, the latter having ports therein communicating with opposite ends of the piston casing, a piston in said casing, a piston rod extending therefrom, an arm adjustably carried by said rod, a rod carried by said arm, a bracket carried by said rod, a removable closure for one end of the slide valve casing, a chambered throw valve casing for closing the other end of the slide valve casing, there being a passage communicating with the throw valve chamber and with the slide valve casing in proximity to the inlet port, there being passages leading from the throw valve chamber to opposite ends of the slide valve casing, a throw valve within the throw valve chamber adapted to control the passages leading therefrom, a valve stem extending from said throw valve, and set collars mounted thereon with which said bracket co-acts to actuate said throw valve.

14. In a water motor, a casing having a diaphragm therein forming an inlet and an outlet chamber, a slide valve casing mounted thereon, means carried by said diaphragm and engaging said casing for preventing improper movement thereof, said slide valve casing having an inlet port communicating with the inlet chamber and an exhaust port communicating with the exhaust chamber, a hollow slide valve mounted in the slide valve casing and having a plurality of annular grooves, one of said grooves being always open to the inlet port, there being a port in said valve always open to the exhaust port, a piston casing mounted on the slide valve casing, the latter having ports communicating with opposite ends thereof and co-acting with one of the slide valve grooves to serve as inlet ports, said slide valve having ports therein co-acting with said ports to serve as exhaust ports, a throw valve casing forming a closure for one end of the slide valve casing and provided with a chamber, there being ports and passages leading therefrom communicating with opposite ends of the slide valve casing, there being a feed port communicating with the throw valve casing, and an exhaust port communicating with said casing, a throw valve having a plurality of heads thereon in said throw valve casing and adapted to admit water alternately to opposite ends of the slide valve, a piston within said piston casing, and means actuated by said piston for intermittently actuating the throw valve.

15. In a water motor, a casing having a diaphragm forming an inlet and an outlet chamber therein, a slide valve casing mounted thereon, means for preventing relative lateral movement of said casings, said slide valve having an inlet port communicating with the inlet chamber and an exhaust port communicating with the outlet chamber, a hollow slide valve non-rotatably mounted in the slide valve chamber having a plurality of annular grooves, one of said grooves always communicating with the exhaust port, one of said grooves always communicating with the inlet port, there being a port in the slide valve communicating with the exhaust port groove, a piston casing mounted on the slide valve casing, there being ports in the latter communicating with opposite ends of the piston casing and co-acting with one of said grooves to act as inlet ports, there being ports in the slide valve co-acting with said ports to serve as exhaust ports, means for forming a chamber at each end of the slide valve casing, a piston in the piston chamber, an arm adjustably carried thereby, a rod carried by said arm, a bracket carried by said rod, and means co-acting with said bracket to actuate said slide valve.

16. In a water motor, a casing having a diaphragm forming an inlet and an outlet chamber therein, a slide valve casing mounted thereon at right angles thereto, means for preventing relative lateral movement of said casings, said slide valve casing having an inlet port communicating with the inlet chamber, and an exhaust port communicating with the outlet chamber, a hollow slide valve non-rotatably mounted in the slide valve chamber and provided with a plurality of annular grooves, one of said grooves being always open to the inlet port and one of said grooves being always open to the exhaust port, said slide valve having a port communicating with the exhaust port groove, a piston casing mounted on the slide valve casing, there being ports through the latter communicating with opposite ends of the piston casing and alternately co-acting with one of said grooves to serve as inlet ports, said slide valve having ports therein alternately co-acting with said ports to serve as exhaust ports, a throw valve casing forming a closure for one end of the slide valve casing, and having ports and passages communicating with opposite sides of said slide valve casing and with a chamber in the throw valve casing, there being a communication between the inlet and the throw valve chamber and between the exhaust and the throw valve chamber, a throw valve mounted in said chamber controlling admission and exhaust to and from opposite ends of the slide valve casing, and means actuated by the piston for intermittently actuating the throw valve.

17. In a water motor, a casing having a diaphragm forming an inlet and an outlet chamber, a slide valve casing mounted thereon at right angles thereto, means for preventing relative lateral movement of said casings, said slide valve casing having an inlet port communicating with the inlet chamber and an exhaust port communicating with the outlet chamber, a hollow slide valve non-rotatably mounted in the slide valve chamber and provided with a plurality of annular grooves, one of said grooves being always open to the inlet port and one of said grooves being always open to the exhaust port, said slide valve having a port communicating with the exhaust port groove, a piston casing mounted on the slide valve casing, there being ports through the latter communicating with opposite ends of the piston casing and alternately co-acting with one of said grooves to serve as inlet ports, said slide valve having ports therein alternately co-acting with said ports to serve as exhaust ports, a throw valve casing forming a closure for one end of the slide valve casing, having ports and passages communicating with opposite sides of said slide valve casing and with a chamber in the throw valve casing, there being a communication between the inlet and the throw valve chamber and between the exhaust and the throw valve chamber, a throw valve mounted in said chamber controlling admission and exhaust to and from opposite ends of the slide valve casing, a removable cover for the piston casing, and means for fastening the casings together.

ADOLPH LANG.

Witnesses:
JOHN A. WIEDERSHEIM,
C. D. McVAY.